US011860704B2

(12) United States Patent
Christian et al.

(10) Patent No.: US 11,860,704 B2
(45) Date of Patent: Jan. 2, 2024

(54) METHODS AND APPARATUS TO DETERMINE USER PRESENCE

(71) Applicant: The Nielsen Company (US), LLC, New York, NY (US)

(72) Inventors: Timothy Christian, Palm Harbor, FL (US); Garrett Sloop, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/403,461

(22) Filed: Aug. 16, 2021

(65) Prior Publication Data
US 2023/0047888 A1 Feb. 16, 2023

(51) Int. Cl.
| | |
|---|---|
| *G06F 1/26* | (2006.01) |
| *G06F 1/32* | (2019.01) |
| *G06F 1/3206* | (2019.01) |
| *H04N 21/442* | (2011.01) |
| *G06F 1/3234* | (2019.01) |
| *G06F 1/16* | (2006.01) |

(52) U.S. Cl.
CPC ............ *G06F 1/3206* (2013.01); *G06F 1/163* (2013.01); *G06F 1/1632* (2013.01); *G06F 1/1694* (2013.01); *G06F 1/3234* (2013.01); *H04N 21/44204* (2013.01); *H04N 21/44213* (2013.01)

(58) Field of Classification Search
CPC ...... G06F 1/3206; G06F 1/163; G06F 1/1694; G06F 1/3234; H04N 21/44204; H04N 21/44213
See application file for complete search history.

(56) References Cited

U.S. PATENT DOCUMENTS

| | | | |
|---|---|---|---|
| 3,805,238 | A | 4/1974 | Rothfjell |
| 4,468,807 | A | 8/1984 | Moulton |
| 4,611,347 | A | 9/1986 | Netravali et al. |
| 4,626,904 | A | 12/1986 | Lurie |
| 4,644,509 | A | 2/1987 | Kiewit et al. |
| 4,658,290 | A | 4/1987 | McKenna et al. |
| 4,769,697 | A | 9/1988 | Gilley et al. |
| 4,779,198 | A | 10/1988 | Lurie |

(Continued)

FOREIGN PATENT DOCUMENTS

| | | |
|---|---|---|
| EP | 0262757 | 4/1988 |
| EP | 1133090 | 9/2001 |

(Continued)

OTHER PUBLICATIONS

Gudino, Miguel, "How do Motion Sensors Work? Types of Motion Sensors," Arrow Electronics, https://www.arrow.com/en/research-and-events/articles/how-motion-sensors-work, Feb. 1, 2018, 5 pages.

(Continued)

*Primary Examiner* — Zhipeng Wang

(57) ABSTRACT

Methods and apparatus to determine user presence are disclosed. A disclosed example monitoring device to determine of a presence of a user in a metering environment includes a mount to couple the monitoring device to a wearable device to be worn by the user, the wearable device to receive content from a content device, a sensor to detect motion of the user, and a transmitter to transmit motion data pertaining to the detected motion of the user for the determination of the presence of the user.

27 Claims, 10 Drawing Sheets

(56) References Cited

U.S. PATENT DOCUMENTS

| | | |
|---|---|---|
| 4,843,631 A | 6/1989 | Steinpichler et al. |
| 4,849,737 A | 7/1989 | Kirihata et al. |
| 4,858,000 A | 8/1989 | Lu |
| 4,993,049 A | 2/1991 | Cupps |
| 5,031,228 A | 7/1991 | Lu |
| 5,063,603 A | 11/1991 | Burt |
| 5,067,160 A | 11/1991 | Omata et al. |
| 5,097,328 A | 3/1992 | Boyette |
| 5,099,324 A | 3/1992 | Abe |
| 5,121,201 A | 6/1992 | Seki |
| 5,144,797 A | 9/1992 | Swars |
| 5,164,992 A | 11/1992 | Turk et al. |
| 5,229,764 A | 7/1993 | Matchett et al. |
| 5,331,544 A | 7/1994 | Lu et al. |
| 5,373,315 A | 12/1994 | Dufresne et al. |
| 5,384,716 A | 1/1995 | Araki et al. |
| 5,412,738 A | 5/1995 | Brunelli et al. |
| 5,481,622 A | 1/1996 | Gerhardt et al. |
| 5,497,185 A | 3/1996 | Dufresne et al. |
| 5,550,928 A | 8/1996 | Lu et al. |
| 5,629,752 A | 5/1997 | Kinjo |
| 5,675,663 A | 10/1997 | Koerner et al. |
| 5,715,325 A | 2/1998 | Bang et al. |
| 5,719,951 A | 2/1998 | Shackleton et al. |
| 5,771,307 A | 6/1998 | Lu et al. |
| 5,781,650 A | 7/1998 | Lobo et al. |
| 5,793,409 A | 8/1998 | Tetsumura |
| 5,801,763 A | 9/1998 | Suzuki |
| 5,805,745 A | 9/1998 | Graf |
| 5,835,616 A | 11/1998 | Lobo et al. |
| 5,850,470 A | 12/1998 | Kung et al. |
| 5,859,921 A | 1/1999 | Suzuki |
| 5,864,630 A | 1/1999 | Cosatto et al. |
| 5,878,156 A | 3/1999 | Okumura |
| 5,892,837 A | 4/1999 | Luo et al. |
| 5,901,244 A | 5/1999 | Souma et al. |
| 5,920,641 A | 7/1999 | Ueberreiter et al. |
| 5,963,670 A | 10/1999 | Lipson et al. |
| 5,978,507 A | 11/1999 | Shackleton et al. |
| 5,987,154 A | 11/1999 | Gibbon et al. |
| 6,014,461 A | 1/2000 | Hennessey et al. |
| 6,032,106 A | 2/2000 | Ishii |
| 6,047,134 A | 4/2000 | Sekine et al. |
| 6,055,323 A | 4/2000 | Okumura |
| 6,144,797 A | 11/2000 | MacCormack et al. |
| 6,332,033 B1 | 12/2001 | Qian |
| 6,332,038 B1 | 12/2001 | Funayama et al. |
| 6,363,159 B1 | 3/2002 | Rhoads |
| 6,507,391 B2 | 1/2003 | Riley et al. |
| 6,625,316 B1 | 9/2003 | Maeda |
| 6,940,545 B1 | 9/2005 | Ray et al. |
| 6,944,319 B1 | 9/2005 | Huang et al. |
| 7,035,467 B2 | 4/2006 | Nicponski |
| 7,043,056 B2 | 5/2006 | Edwards et al. |
| 7,134,130 B1 | 11/2006 | Thomas |
| 7,155,159 B1 | 12/2006 | Weinblatt et al. |
| 7,158,177 B2 | 1/2007 | Kage et al. |
| 7,203,338 B2 | 4/2007 | Ramaswamy et al. |
| 7,440,593 B1 | 10/2008 | Steinberg et al. |
| 7,466,844 B2 | 12/2008 | Ramaswamy et al. |
| 7,602,524 B2 | 10/2009 | Eichhorn et al. |
| 7,609,853 B2 | 10/2009 | Ramaswamy et al. |
| 7,636,456 B2 | 12/2009 | Collins et al. |
| 7,676,065 B2 | 3/2010 | Wiedemann et al. |
| 7,697,735 B2 | 4/2010 | Adam et al. |
| 7,796,154 B2 | 9/2010 | Senior et al. |
| 7,899,209 B2 | 3/2011 | Greiffenhagen et al. |
| 8,194,923 B2 | 6/2012 | Ramaswamy et al. |
| 8,620,088 B2 | 12/2013 | Lee |
| 8,660,308 B2 | 2/2014 | Ramaswamy et al. |
| 8,824,740 B2 | 9/2014 | Ramaswamy et al. |
| 9,020,780 B2 | 4/2015 | Zhang et al. |
| 9,082,004 B2 | 7/2015 | Nielsen |
| 9,426,525 B2 | 8/2016 | Soundararajan et al. |
| 9,560,267 B2 | 1/2017 | Nielsen |
| 9,609,385 B2 | 3/2017 | Hicks |
| 9,843,717 B2 | 12/2017 | Nielsen |
| 10,165,177 B2 | 12/2018 | Nielsen |
| 10,966,007 B1 * | 3/2021 | Fenner ............... H04R 1/1016 |
| 11,232,688 B1 | 1/2022 | Lemberger et al. |
| 11,245,839 B2 | 2/2022 | Nielsen |
| 11,470,243 B2 | 10/2022 | Nielsen |
| 2002/0198762 A1 | 12/2002 | Donato |
| 2003/0033600 A1 | 2/2003 | Cliff et al. |
| 2003/0081834 A1 | 5/2003 | Philomin et al. |
| 2003/0093784 A1 | 5/2003 | Dimitrova et al. |
| 2004/0122679 A1 | 6/2004 | Neuhauser et al. |
| 2004/0220753 A1 | 11/2004 | Tabe |
| 2005/0117783 A1 | 6/2005 | Sung et al. |
| 2005/0144632 A1 | 6/2005 | Mears et al. |
| 2005/0198661 A1 | 9/2005 | Collins et al. |
| 2006/0062429 A1 | 3/2006 | Ramaswamy et al. |
| 2006/0133699 A1 | 6/2006 | Widrow et al. |
| 2006/0200841 A1 | 9/2006 | Ramaswamy et al. |
| 2007/0121959 A1 * | 5/2007 | Philipp ............... H04R 1/1041 381/74 |
| 2007/0150916 A1 | 6/2007 | Begole et al. |
| 2007/0154063 A1 | 7/2007 | Breed |
| 2007/0263934 A1 | 11/2007 | Ojima et al. |
| 2007/0294126 A1 | 12/2007 | Maggio |
| 2008/0091510 A1 | 4/2008 | Crandall et al. |
| 2008/0232650 A1 | 9/2008 | Suzuki et al. |
| 2008/0243590 A1 | 10/2008 | Rich |
| 2008/0271065 A1 | 10/2008 | Buonasera et al. |
| 2009/0070797 A1 | 3/2009 | Ramaswamy et al. |
| 2009/0091650 A1 | 4/2009 | Kodama |
| 2009/0133058 A1 | 5/2009 | Kouritzin et al. |
| 2009/0177528 A1 | 7/2009 | Wu et al. |
| 2009/0265729 A1 | 10/2009 | Weinblatt |
| 2009/0290756 A1 | 11/2009 | Ramaswamy et al. |
| 2009/0307084 A1 | 12/2009 | Monighetti et al. |
| 2009/0310829 A1 | 12/2009 | Baba et al. |
| 2010/0124274 A1 | 5/2010 | Cheok et al. |
| 2010/0245567 A1 | 9/2010 | Krahnstoever et al. |
| 2011/0019924 A1 | 1/2011 | Elgersma et al. |
| 2011/0023060 A1 | 1/2011 | Dmitriev et al. |
| 2011/0137721 A1 | 6/2011 | Bansal |
| 2011/0164188 A1 | 7/2011 | Karaoguz et al. |
| 2011/0169953 A1 | 7/2011 | Sandler et al. |
| 2011/0265110 A1 | 10/2011 | Weinblatt |
| 2011/0285845 A1 | 11/2011 | Bedros et al. |
| 2012/0081392 A1 | 4/2012 | Arthur |
| 2012/0151079 A1 | 6/2012 | Besehanic et al. |
| 2013/0013396 A1 | 1/2013 | Vinson et al. |
| 2013/0129159 A1 | 5/2013 | Huijgens et al. |
| 2013/0152113 A1 | 6/2013 | Conrad et al. |
| 2013/0156273 A1 | 6/2013 | Nielsen |
| 2013/0229518 A1 | 9/2013 | Reed et al. |
| 2014/0052405 A1 * | 2/2014 | Wackym ............... A61B 5/6803 702/141 |
| 2014/0254880 A1 | 9/2014 | Srinivasan et al. |
| 2014/0366123 A1 * | 12/2014 | DiBona ............... G06Q 10/00 726/16 |
| 2015/0057964 A1 | 2/2015 | Albinali |
| 2015/0057967 A1 * | 2/2015 | Albinali ............... A61B 5/1118 702/150 |
| 2015/0271390 A1 | 9/2015 | Nielsen |
| 2016/0037209 A1 | 2/2016 | Miyoshi |
| 2016/0065902 A1 | 3/2016 | Deng |
| 2016/0261911 A1 | 9/2016 | Soundararajan et al. |
| 2017/0142330 A1 | 5/2017 | Nielsen |
| 2018/0048807 A1 | 2/2018 | Nielsen |
| 2018/0089898 A1 * | 3/2018 | Huddy ............... H04W 4/029 |
| 2018/0268865 A1 | 9/2018 | Ekambaram et al. |
| 2018/0285634 A1 | 10/2018 | Varadarajan et al. |
| 2019/0089894 A1 | 3/2019 | Nielsen |
| 2019/0287052 A1 | 9/2019 | Sundar et al. |
| 2019/0287380 A1 * | 9/2019 | Verbeke ............... H05B 47/115 |
| 2019/0295393 A1 | 9/2019 | Lee et al. |
| 2019/0325228 A1 | 10/2019 | Chaudhry et al. |
| 2020/0265835 A1 * | 8/2020 | Ni ............... G10L 15/08 |
| 2020/0275835 A1 * | 9/2020 | Chintala ............... A61B 5/316 |
| 2020/0296463 A1 | 9/2020 | Martinez et al. |
| 2020/0351436 A1 | 11/2020 | Nielsen |

(56) References Cited

U.S. PATENT DOCUMENTS

| | | | |
|---|---|---|---|
| 2020/0364885 A1 | 11/2020 | Latapie et al. | |
| 2020/0374491 A1 | 11/2020 | DeAngelus et al. | |
| 2021/0000403 A1* | 1/2021 | Xu | H04M 1/72451 |
| 2021/0133483 A1 | 5/2021 | Prabhu et al. | |
| 2021/0281943 A1* | 9/2021 | Lehnert | G06F 3/04883 |
| 2021/0319782 A1* | 10/2021 | Gong | G10L 15/08 |
| 2021/0327243 A1 | 10/2021 | Franco et al. | |
| 2021/0400427 A1 | 12/2021 | Burowski et al. | |
| 2021/0409844 A1 | 12/2021 | Livoti et al. | |
| 2022/0052867 A1* | 2/2022 | Nakano | H04W 4/023 |
| 2022/0171466 A1* | 6/2022 | Zhang | G06F 3/147 |
| 2022/0279243 A1 | 9/2022 | Watts | |

FOREIGN PATENT DOCUMENTS

| | | |
|---|---|---|
| WO | 9605571 | 2/1996 |
| WO | 9927668 | 6/1999 |
| WO | 2004053791 | 6/2004 |
| WO | 2004054255 | 6/2004 |

OTHER PUBLICATIONS

Teixeira et al., A Survey of Human-Sensing: Methods for Detecting Presence, Count, Location, Track, and Identity, ENALAB Technical Report Sep. 2010, vol. 1, No. 1, Sep. 2010, 41 pages.

United States Patent and Trademark Office, "Notice of Allowance and Fee(s) Due," issued in connection with U.S. Appl. No. 17/561,473, dated Mar. 29, 2023, 8 pages.

Wikipedia, "Kinect," Wikipedia, Dec. 2010, [http://en.wikipedia.org/wiki/Kinect], 15 pages.

United States Patent and Trademark Office, "Non-Final Office Action," issued in connection with U.S. Appl. No. 17/561,473, dated Jul. 21, 2022, 17 pages.

IBM, "Infrared Person Tracking," IBM ECVG, last updated Jun. 12, 2002, [http://www.research.ibm.com/ecvg/misc/footprint.html] retrieved on May 6, 2009, 2 pages.

Duda et al., "Pattern Classification and Scene Analysis: Chapter 2, Bayes Decision Theory," John Wiley & Sons, 1973, 19 pages.

Qing et al., "Histogram Based Fuzzy C-Mean Algorithm," IEEE, 1992, 4 pages.

Graham-Rowe, "Hot Shopping," New Scientist Magazine, Issue 2230, Mar. 18, 2000, p. 12, [http://www.newscientist.com/article.ns?id=mg16522301.700&print=true], 1 page.

United States Patent and Trademark Office, "Notice of Allowance and Fee(s) Due," issued in connection with U.S. Appl. No. 17/561,473, dated Dec. 16, 2022, 8 pages.

United States Patent and Trademark Office, "Notice of Allowability," issued in connection with U.S. Appl. No. 17/561,473, dated Jan. 5, 2023, 2 pages.

United States Patent and Trademark Office, "Non-Final Office Action," issued in connection with U.S. Appl. No. 17/175,354, dated Jan. 20, 2023, 5 pages.

* cited by examiner

METHODS AND APPARATUS TO DETERMINE USER PRESENCE

FIELD OF THE DISCLOSURE

This disclosure relates generally to audience exposure and, more particularly, to methods and apparatus to determine user presence.

BACKGROUND

Determination of audience exposure to content (e.g., streaming content such as audio, video, etc.) typically involves associating content with users. The content is often delivered to the users and presented via content devices, such as televisions, computers, set top boxes, gaming consoles and the like.

Figure 1:
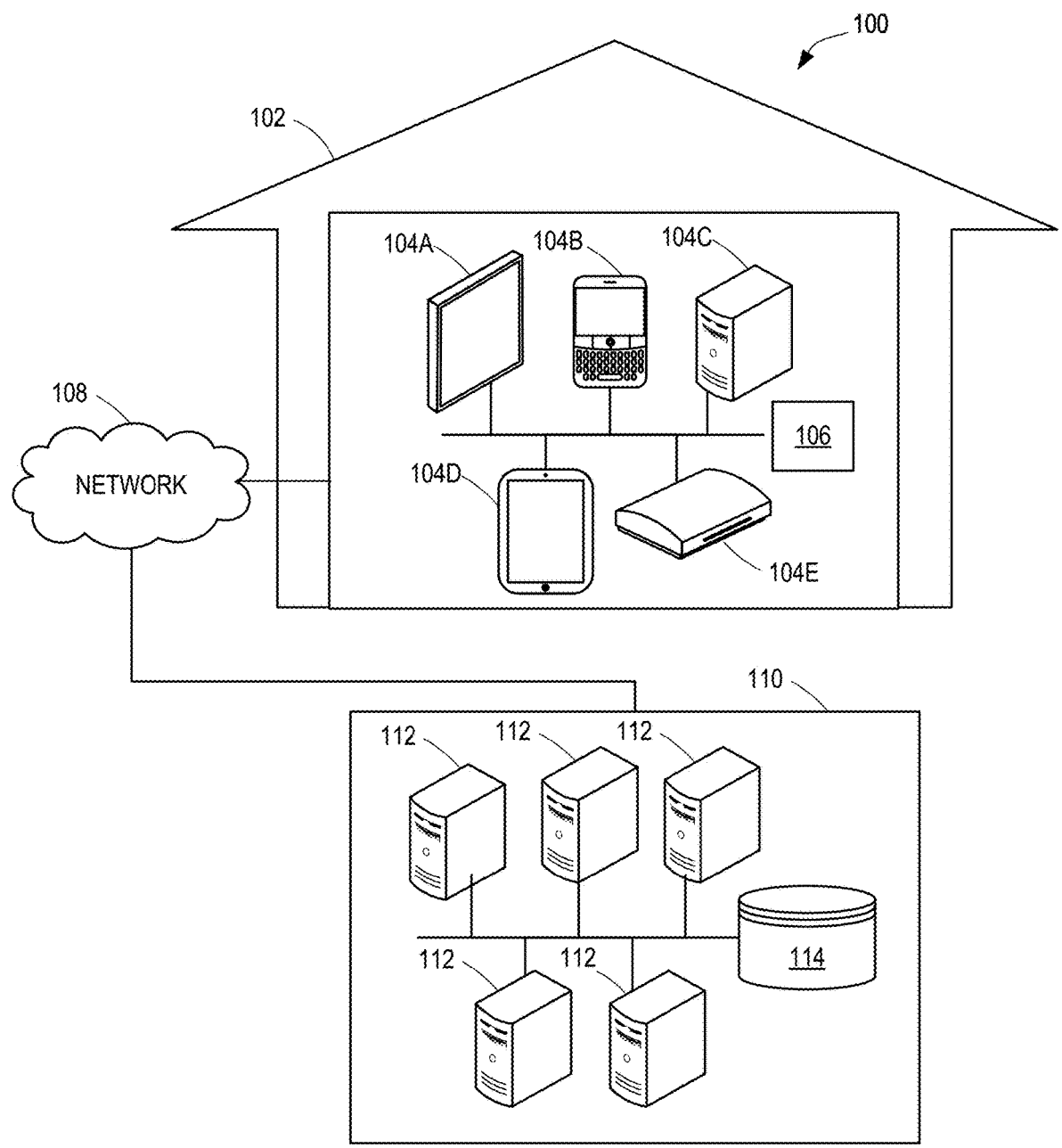
FIG. 1 illustrates an example environment in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus to determine user presence are disclosed. In known implementations, determination of audience exposure to content (e.g., streaming audio, video, etc.) typically involves associating content with users based on their exposure to the content. A known implementation to measure audience exposure includes utilization of an audio beacon system that collects information pertaining to exposure of a user by detecting encoded audio signals from content devices and recording each time a signal is detected. In some known implementations, audio is detected via sensors (e.g., microphones, light sensors, camera sensors, etc.) to determine the exposure. Further, the content presented to users from content devices (e.g., televisions, computers, set top boxes, gaming consoles, etc.) does not usually indicate a presence of the user (e.g., content is presented but the user is not present). In other words, known implementations can be used in determining content consumed by the user, but not generally indicate whether the user is present when the content is being streamed, for example.

Another known technique used to measure audience exposure involves includes installation of metering equipment within a monitored site (e.g., a home). In such known implementations, as content is presented to a content device, the metering equipment collects identification information regarding the content. However, these implementations are usually not compatible with simultaneous use of wearable devices that can present content, such as headphones, virtual reality headsets, etc., because the metering equipment usually does not generally have the capability of detecting whether a user is present during content presentation. Moreover, the specialized equipment for metering can skew data (i.e., based on users who opt to have the metering equipment in their home) and also necessitate expensive equipment.

Examples disclosed herein enable accurate, cost-effective, easy to implement, and energy-efficient determination of audience presence during exposure to presented content (e.g., streaming audio, video, etc.) by detecting even relatively small movements of a wearable device that is presenting the content. In other words, examples disclosed herein can enhance exposure data with an indication of whether users are present, thereby reducing inaccuracies presented without such a determination. Further, examples disclosed herein can be implemented on existing content devices for wireless transmission of motion data from a sensor to a content device providing content to the wearable device. Thus, examples disclosed herein can accurately obtain motion data and, thus, determine a presence of a user without significant modifications to the wearable device and/or adding specialized hardware.

According to examples disclosed herein, a monitoring device is coupled to (e.g., releasably coupled to, permanently fixed to, snapped to, adhered to, magnetically coupled to, etc.) a wearable device worn by a user (e.g., an audience member). The example wearable device provides and/or shows content to the user (e.g., content is streamed to the wearable device). According to examples disclosed herein, the example monitoring device includes a mount to couple the device to the wearable device, a sensor to detect motion of the wearable device and/or the user, a transmitter to transmit motion data acquired/detected by the sensor (e.g., to a content device), and a body or base supported by the mount to position and/or support the transmitter and the sensor. In some examples, the monitoring device includes a monitoring device controller to analyze and/or characterize the motion data, determine a user presence based on the detected motion from the sensor, and/or provide the motion data to a central database. In other examples, the monitoring device is integral with (e.g., included within) circuitry of the wearable device. According to examples disclosed herein, the aforementioned motion data is analyzed for determination of a user presence. In some examples, the motion data (e.g., raw motion data, signals associated with or corresponding to motion data) is transmitted to the content device from the wearable device for determination of the user presence. In some examples, the content device instructs the wearable device to turn off in response to the motion data being below a threshold, which indicates that the user is not using the device.

In some examples, a degree of user presence (e.g., a probability of the user presence) is calculated and/or determined based on the motion data obtained from the sensor coupled to the wearable device. For example, if the motion data obtained from the sensor exceeds a minimum threshold value, examples disclosed herein determine the presence of the user. In some examples, the motion data is transmitted from the wearable device to the content device (e.g., for subsequent determination of the user presence). In some such examples, the content is associated with the presence of the user during the exposure period, thereby enhancing and/or augmenting metering data associated with the user.

In some examples, the motion data includes a change in acceleration of a sensor along at least one axis. In other examples, the motion data includes rotational velocities or an orientation along at least one axis. In some such examples, determination of the user presence is based on a degree of change of parameters of the motion data (e.g., motion data parameter values exceed a minimum threshold value). Additionally or alternatively, biometric and/or physiological data associated with the user (e.g., a body temperature) is utilized in determination of the user presence.

FIG. 1 illustrates an example environment 100 in which examples disclosed herein can be implemented. The example environment 100 can be referred to as a metering environment and supports audience measurement of content presented to users at one or more monitoring sites, such as an example monitored site 102 illustrated in FIG. 1, and includes example content devices 104. Although the example of FIG. 1 illustrates one of the monitored site 102 and five of the content devices 104 (i.e., 104A-104E), examples disclosed herein can be implemented in environments 100 supporting any number of monitored sites 102 having any number of content devices 104. Further, examples disclosed herein can be implemented in any appropriate network configuration and/or topology.

The environment 100 of the illustrated example includes an example metering controller 106 to monitor content presented by the content devices 104 to the users. In the illustrated example, the content monitored by the metering controller 106 can correspond to any type of content presentable by the content devices 104. For example, monitored content can correspond to content such as television programs, radio programs, movies, Internet video, video-on-demand, etc., as well as commercials, advertisements, etc. In this example, the metering controller 106 determines metering data that may identify and/or be used to identify content presented by the content devices 104 (and thus, infer content exposure) at the monitored site 102. The metering controller 106 then stores and reports this metering data via an example network 108 to an example data processing facility 110.

In this example, the data processing facility 110 stores, maintains, and analyzes patterns or trends associated with the metering data and performs any appropriate post-processing of the metering data to, for example, determine audience ratings information, identify targeted advertising to be provided to the monitored site 102, etc. In this example, the data processing facility 110 can correspond to any type(s) and/or number of external facilities, cloud-based data centers, or in-house facilities and includes example servers 112 and an example central database 114. In the illustrated example, the network 108 can correspond to any type(s) and/or number of wired and/or wireless data networks or any combination thereof.

In the illustrated example, each of the content devices 104 monitored by the metering controller 106 can correspond to any type of audio, video, and/or multimedia presentation device capable of presenting content audibly and/or visually. For example, each of the content devices 104 can correspond to a multimedia computer system, a personal digital assistant, a cellular/mobile smartphone, a radio, a table computer, etc.

Figure 2:
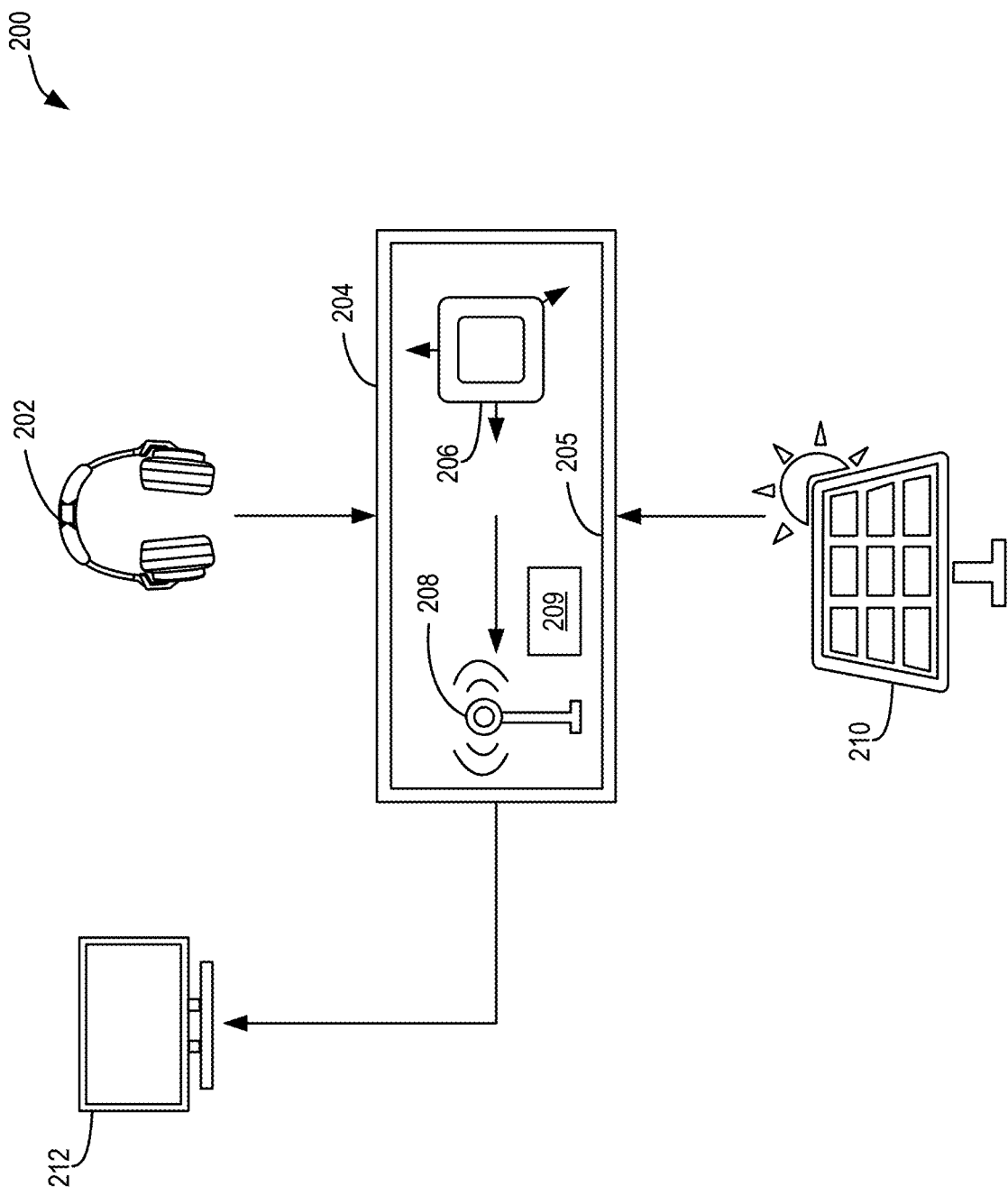
FIG. 2 illustrates an example user monitoring system in accordance with teachings of this disclosure.

FIG. 2 illustrates an example user monitoring system 200 in accordance with teachings of this disclosure. The example user monitoring system 200 includes an example wearable device 202 to be worn by a user during content presentation, for example. According to examples disclosed herein, a monitoring device 204 is coupled to the example wearable device 202 to monitor user movement for use in determination of a user presence.

The example monitoring device 204 includes a body (e.g., a base, a housing, a chassis, a support structure, etc.) 205 supported by a mount 304 shown and described below in connection with FIG. 3. The example monitoring device further includes a sensor (e.g., an accelerometer, a gyroscope, an inertial measurement unit, etc.) 206 to monitor changes in acceleration, movement (e.g., translational movement, rotational movement, etc.), or body temperature of the wearable device 202 and/or the user. The example sensor 206 measures acceleration along three axes as motion data that is utilized for a determination of user presence. The monitoring device 204 also includes a transmitter 208 to transmit the motion data (e.g., signals associated with or corresponding to the motion data) from the sensor 206 to a content device (e.g., an audio interception device, a content interception device, a streaming box, a metering content device, etc.) 212, which may be implemented in the content device 104 of FIG. 1. The example body 205 holds, aligns and/or supports the sensor 206 and the transmitter 208. In some examples, the monitoring device 204 further includes a monitoring device controller 209 to control the monitoring device 204 and/or process/analyze data from the sensor 206. In some examples, the monitoring device 204 is coupled to (e.g., electrically coupled to, mechanically coupled to, chemically coupled to, fastened to, magnetically coupled to, etc.) a solar panel 210 to power the sensor 206, which is implemented as an accelerometer in this example, and the transmitter 208, and/or, more generally, the monitoring device 204. Alternatively, the solar panel 210 can be part of the monitoring device 204.

According to some examples disclosed herein, the transmitter 208 is communicatively coupled to or implements low energy Bluetooth™ circuitry to wirelessly transmit the aforementioned motion data and/or data pertaining to determined motion of the wearable device 202 and/or the user to the content device 212. In some such examples, the low energy Bluetooth™ circuitry is used to transmit audio codes from the content presented to the wearable device 202 to the content device 212, wherein the wearable device 202 utilizes a wired connection or a base station that is connected to the content device 212. However, any appropriate other communication standard and/or protocol can instead be implemented. In some examples, the transmitter 208 transmits the motion data to the content device at regular and/or periodic intervals. In other examples, the motion data is transmitted when motion is detected (e.g., when motion values exceed a threshold). In the illustrated example, the content device 212 can correspond to any type of audio, video, and/or multimedia presentation device capable of presenting content audibly or visually to the wearable device 202. For example, the content device 212 can correspond to a television, a computer, a set top box, a gaming console, etc. that provides (e.g., transmits) content (e.g., monitored content, metered content, etc.) to the wearable device 202 for viewing and/or listening by the user. Additionally or alternatively, the content device 212 can correspond to a metering device (e.g., a content interception device). In some examples, the content device 212 provides data that may identify and/or be used to identify the content presented by the content device 212 while the user is exposed to the content.

In some examples, the transmitter 208 transmits the motion data (e.g., signals associated with or corresponding to motion data) acquired by the sensor 206 to the content device 212. The content device 212 and/or a device external to the wearable device that is communicatively coupled to the content device 212 can determine the presence of the user. In other examples, the motion data from the sensor 206 is wirelessly transmitted from the wearable device 202 to the content device 212 for subsequent processing thereof for determination of the presence of the user. In some other examples, the monitoring device 204 can be embedded within and/or integrated with (i.e., integral with) the circuitry of the wearable device 202 for transmission of the motion data to the content device 212. Additionally or alternatively, the monitoring device 204 is plugged into the wearable device 202 (e.g., as a plug-in module for the wearable device 202).

In some examples, the monitoring device controller 209 can analyze and/or sort the motion data. Additionally or alternatively, the example monitoring device controller 209 determines a user presence based on the detected motion data. In some such examples, the monitoring device controller 209 determines whether the motion data obtained from the sensor 206 exceeds a threshold value and determines the presence of the user. The threshold value can correspond to a minimum value (e.g., a minimum accelerometer value pertaining to a certain type of wearable device and common usage of that wearable device) and, in some examples, the threshold value can be adjusted based on region or location (e.g., the threshold value is different for a location with more seismic activity than a location without seismic activity, the threshold value is adjusted for a user that lives near a train station, etc.). Additionally or alternatively, the monitoring device controller 209 can also the identify the content from the content device and direction transmission of associated content data to a central database 114 via the transmitter 208, for example.

In some examples, the solar panel 210 can use ambient light to power the monitoring device 204, thereby reducing (e.g., eliminating) the need for the user to manually charge the monitoring device 204. In other words, the monitoring device 204 can simply be coupled to the wearable device 202 without the need to remove the monitoring device 204 for recharging, thereby making the monitoring device 204 minimally intrusive for the user.

In other examples, the monitoring device 204 can be shut down and/or placed into a low-power mode to preserve battery life of the wearable device 202. In some such examples, the monitoring device controller 209 transmits a signal to place the wearable device into a low-power mode based on the motion data indicating that the motion of the user is below a threshold value. The monitoring device can then enter a low-power mode when a significant amount of motion is not detected by the sensor 206 for a threshold duration (e.g., 30 seconds, 1 minutes, 15 minutes, 30 minutes, 1 hour, etc.). Additionally or alternatively the content device 212 causes the wearable device 202 to enter a low-power mode after the content device 212 determines that the user is not present for the threshold time duration.

Figure 3:
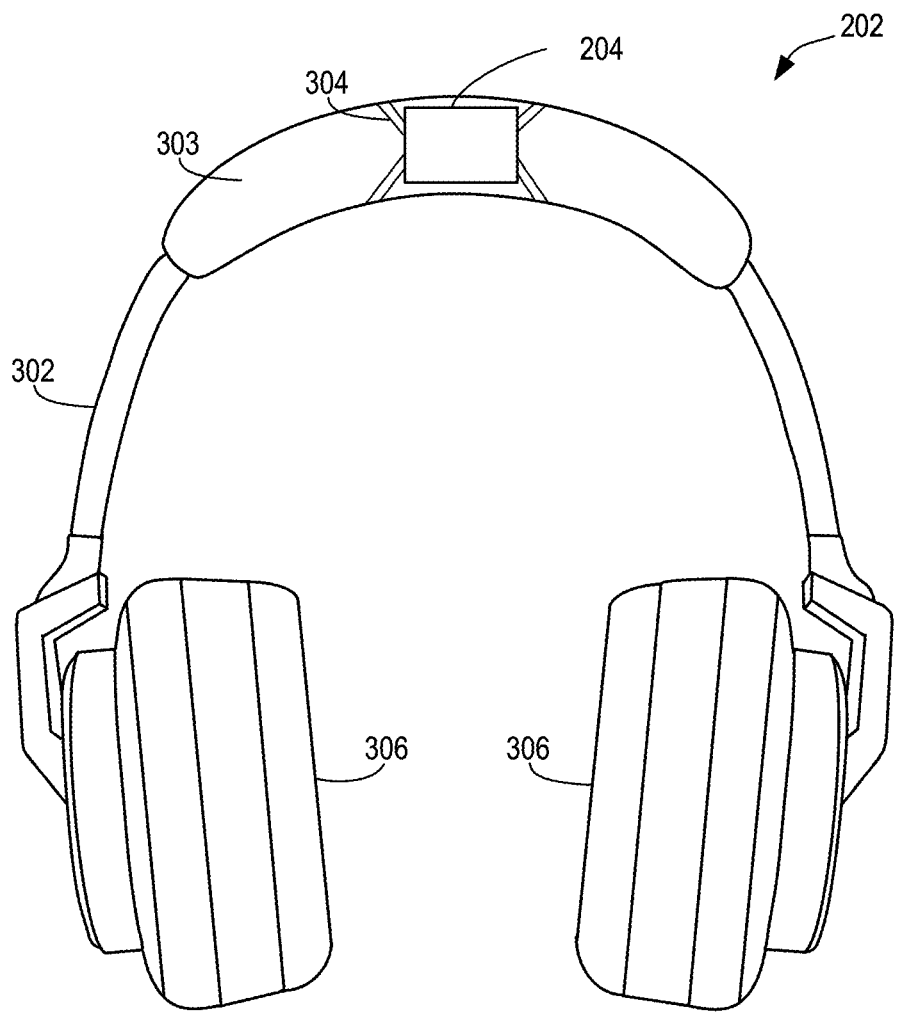
FIG. 3 is a front view of an example wearable device that can be implemented in examples disclosed herein.

FIG. 3 is a front view of the example wearable device 202. The example wearable device 202 includes a generally arch-shaped headband 302 having a cushion 303 to which the monitoring device 204 is coupled by the aforementioned mount 304, as well as drivers (e.g., speaker drivers, speaker mounts, etc.) 306 positioned at opposing ends of the headband 302. In the illustrated example, the mount 304 is implemented to couple (e.g., secure, releasably couple, fix, adhere, etc.) the monitoring device 204 to the wearable device 202 and can correspond to any type(s) and/or number of attachment devices, or mechanisms including, but not limited to, mechanical fasteners, adhesives, magnets, chemical fasteners, suction cups, fasteners, buckles, clasps, a snap fit, magnetic coupling, or any combination thereof. In the illustrated example, the monitoring device 204 is shown mounted to the cushion 303. Alternatively, the monitoring device 204 may be mounted to one of the drivers 306 or any other appropriate location of the headband 302 and/or the wearable device 202.

In the illustrated example, the user wears the wearable device 202 to listen to and/or view the content streamed and/or transmitted from the content device 212 shown in FIG. 2. In other words, the user is exposed to the streamed content presented at the wearable device 202 while wearing the wearable device 202. According to the illustrated example, as the user is exposed to the content, the user transfers some degree of movement to the wearable device 202 even when the user is generally stationary. In particular, even if the user moves to a relatively small degree while listening to the content, the monitoring device 204 can detect relatively slight movement(s) of the user for determination of a presence of the user.

As mentioned above, the monitoring device 204 is directly coupled to the wearable device 202 by the mount 304 to facilitate determination of the presence of the user. Advantageously, coupling the monitoring device 204 directly to the wearable device 202 enables increased accuracy in exposure data by augmenting and/or enhancing exposure data with a user presence, for example. Further, the coupling of the monitoring device 204 to the wearable device 202 does not necessitate modifications to the wearable device technology and/or specialized hardware, thereby enabling cost-effective and relatively easy implementation. Additionally, by utilizing a relatively low energy transmitter and sensor, the monitoring device 204 can be generally compact and lightweight, thereby reducing (e.g., eliminating) any potential negative effects to a user experience associated with the wearable device 202. Further, the transmitter 208 can transmit the motion data between the wearable device 202 and the content device 212 in an energy-efficient manner via communication protocols such as low energy Bluetooth™. Thus, examples disclosed herein can be easily implemented over a large population to enhance exposure data.

Figure 4:
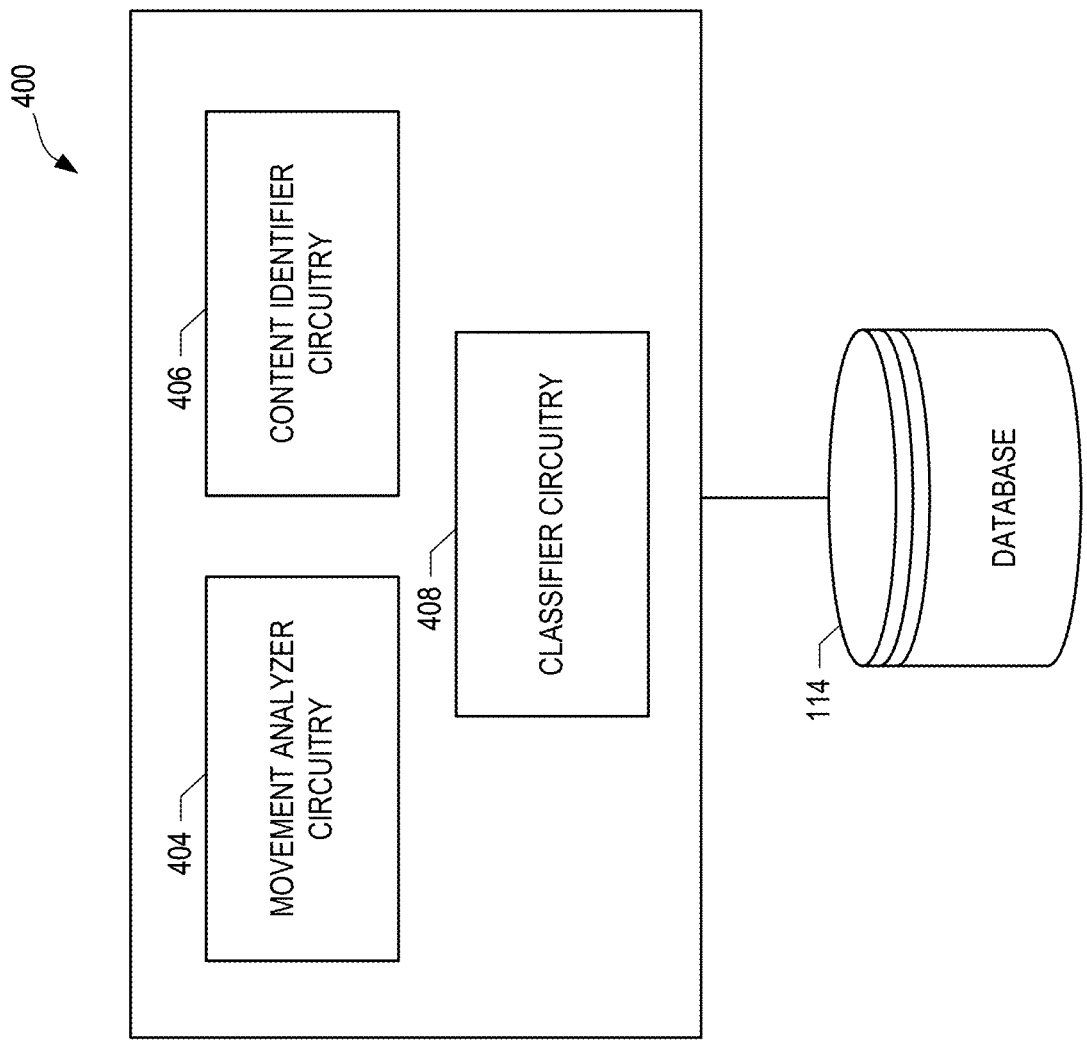
FIG. 4 is a schematic overview of an example audience analyzer system that can be implemented in examples disclosed herein.

FIG. 4 is a schematic overview of an example audience analyzer system 400 in accordance with teachings of this disclosure. The example audience analyzer system processes and/or analyzes movement data and transmits the movement data and/or associated information of the movement data to the example central database 114 described above in connection with FIG. 1. The example audience analyzer system 400 can be implemented in the content device 212 of FIG. 2, the wearable device 202, the monitoring device 204, the monitoring device controller 209, the content devices 104, the processing facility 110, and/or the servers 112 of FIG. 1 to enhance and/or augment user exposure/metering data. The example analyzer system 400 includes example movement analyzer circuitry 404, example content identifier circuitry 406, and example classifier circuitry 408, all of which can be communicatively coupled to the aforementioned database 114.

In the illustrated example, the movement analyzer circuitry 404 collects and/or retrieves the motion data from the sensor 206 via the transmitter 208 of FIG. 2, and determines whether a user is present (e.g., wearing the wearable device 202 as content is presented to the user) based on even relatively slight movements. In some examples, the motion data includes a change in orientation detected by the sensor 206. Additionally or alternatively, the motion data includes a change in acceleration along any axis detected by the sensor 206. In further examples, the motion data includes a change in rotational velocity. In some examples, the motion data includes detected infrared radiation (e.g., detected in nearby surroundings). The motion data is then compared by the movement analyzer circuitry 404 to a minimum threshold value pertaining to a threshold degree of movement, for example. In some examples, if the motion data acquired by the sensor 206 exceeds the threshold value, the movement analyzer circuitry 404 determines that the user is present. Conversely, if the motion data does not exceed the minimum threshold value, the movement analyzer circuitry 404 determines that there is no user present, for example.

In some examples, the content identifier circuitry 406 is implemented to determine, log, record and/or identify the content presented at the content device 212 and/or the wearable device 202. In some examples, the content identifier circuitry 406 is communicatively coupled to the content device 212 for obtaining the content data. The content data can correspond to the amount and/or type(s) of content presented during an audience exposure period, for example. In some examples, when the content is not presented to the wearable device 202 during an audience exposure period, the content identifier circuitry 406 indicates that no content was presented.

In some examples, the example content identifier circuitry 406 identifies the content presented to the wearable device 202 by extracting a signature from the content signal and comparing the signature to a reference signature in order to determine and/or identify the content. If no content is being presented from the content device 212, the content identifier circuitry 406 will determine that no signals or signatures are being transmitted from the content device 212 to the wearable device 202 (e.g., transmitted with a defined time period) and will, thus, determine that the content is not being presented, for example.

The example classifier circuitry 408 is communicatively coupled to the movement analyzer circuitry 404 and the content identifier circuitry 406. In this example, when the movement analyzer circuitry 404 detects that a user is present and the content identifier circuitry 406 determines that content from the content device 212 is being presented on the wearable device 202, the classifier circuitry 408 classifies the listening period as active (e.g., as having a user presence). In some examples, the classifier circuitry 408 then associates the content and/or data corresponding to the content with the user if the listening period is determined to be active, which can be referred to as an active exposure period, for example. In response to a determination that the user is present, the example classifier circuitry 408 transmits the relevant user data and content data obtained from the content identifier circuitry 406 to a central database 114.

While an example manner of implementing the audience analyzer system 400 of FIG. 4 is illustrated in FIG. 4, one or more of the elements, processes, and/or devices illustrated in FIG. 4 may be combined, divided, re-arranged, omitted, eliminated, and/or implemented in any other way. Further, the example movement analyzer circuitry 404, the example content identifier circuitry 406, the example classifier circuitry 408, and/or, more generally, the example audience analyzer system 400 of FIG. 4, may be implemented by hardware, software, firmware, and/or any combination of hardware, software, and/or firmware. Thus, for example, any of the example movement analyzer circuitry 404, the example content identifier circuitry 406, the example classifier circuitry 408, and/or, more generally, the example audience analyzer system 400 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example movement analyzer circuitry 404, the example content identifier circuitry 406, and/or the example classifier circuitry 408 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audience analyzer system 400 of FIG. 4 may include one or more elements, processes, and/or devices in addition to, or instead of, those illustrated in FIG. 4, and/or may include more than one of any or all of the illustrated elements, processes and devices.

Figure 5A:
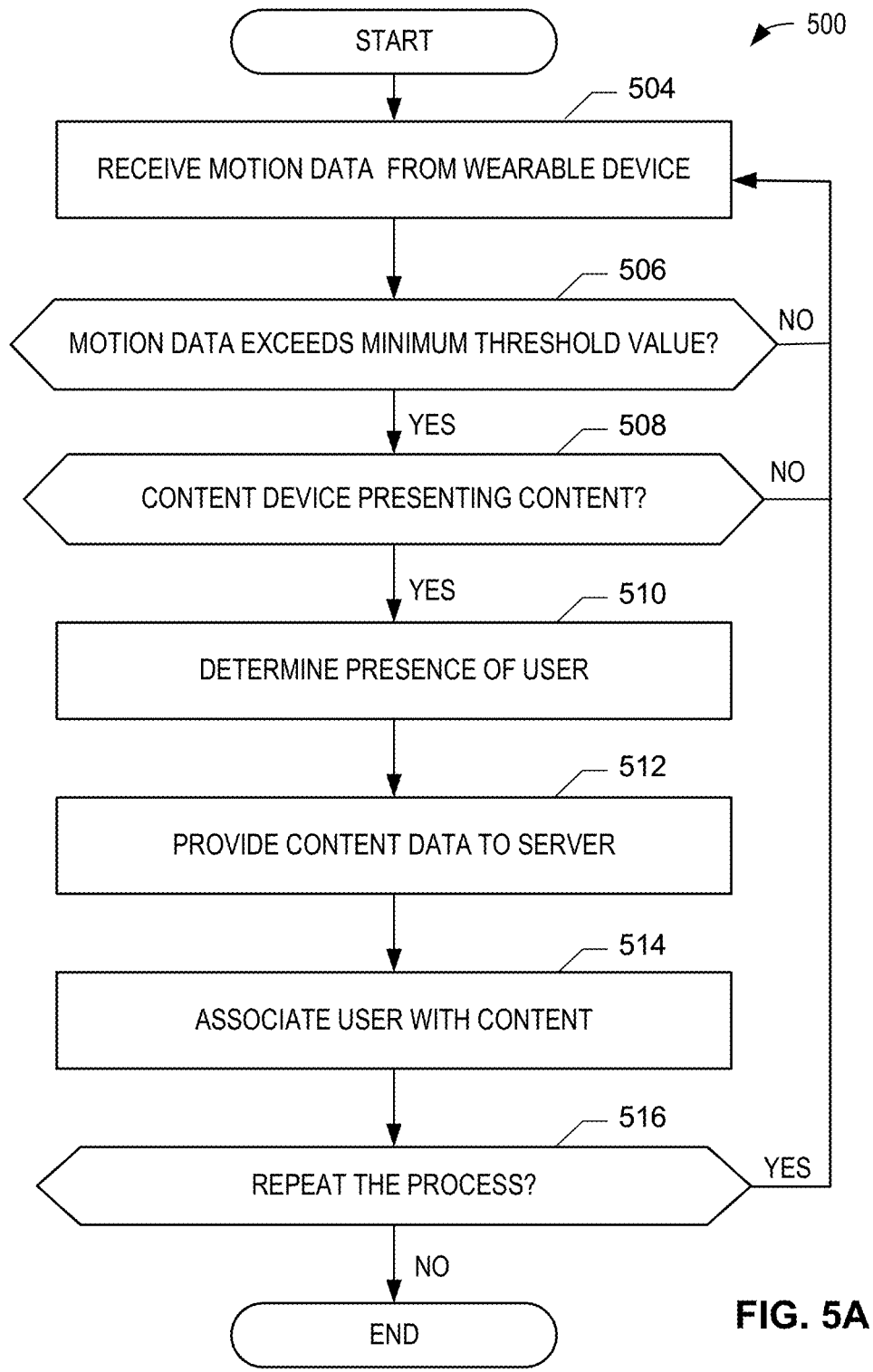
FIG. 5A is a flowchart representative of example machine readable instructions that may be executed by example processor circuitry to implement the example user monitoring system of FIG. 2 and/or the example audience analyzer system of FIG. 4.

A flowchart representative of example hardware logic circuitry, machine readable instructions, hardware implemented state machines, and/or any combination thereof for implementing the audience analyzer system 400 of FIG. 4 is shown in FIG. 5A. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5A, many other methods of implementing the example audience analyzer system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5A is a flowchart representative of example machine readable instructions and/or operations 500 which may be executed and/or instantiated by processor circuitry to implement the example user monitoring system 200 of FIG. 2 and/or the example audience analyzer system 400 of FIG. 4. The example machine readable instructions 500 begin as the example audience analyzer system 400 is to determine a presence of a user.

At block 504, the movement analyzer circuitry 404 receives motion data from the wearable device 202. The motion data can correspond to sensor output data from the example sensor 206.

At block 506, the example movement analyzer circuitry 404 determines whether the motion data associated with the user has exceeded a minimum threshold value. Additionally or alternatively, the determination (block 506) may be based upon whether the motion data has yielded consistent and/or relatively constant movement pattern(s) and/or changed significantly. If the motion data does not exceed the minimum threshold value (block 506), control of the process returns to block 502. Otherwise, the process proceeds to block 508.

At block 508, the example content identifier circuitry 406 determines whether the aforementioned content is being presented (e.g., being played, streaming, etc.) by the content device 212. For example, content data pertaining to the content can be utilized by the content identifier circuitry 406 to identify and characterize the content to which the user is actively exposed during the exposure period. In some examples, the content data is acquired and subsequently identified. If the content device 212 is presenting content (block 508), control of the process proceeds to block 510. Otherwise, the process returns to block 502.

At block 510, the example classifier circuitry 408 determines a user presence based on the detected motion data. In this example, the classifier circuitry 408 is communicatively coupled to the movement analyzer circuitry 404 and the content identifier circuitry 406 to associate the active exposure period with the corresponding content presented at the time of detected motion or a time period proximate the detected motion.

At block 512, the aforementioned content data is transferred from the content identifier circuitry 406 to a central database 114 by the classifier circuitry 408. In some examples, the content data and/or user data pertaining to the active exposure period are transferred to the central database 114.

At block 514, in some examples, the classifier circuitry 408 associates the determined movement from the movement analyzer circuitry with the determined content from the content identifier circuitry.

At block 516, a decision is made whether to repeat the process. If the process is to be repeated (block 516), control of the process returns to block 502. Otherwise, the process ends. This determination may be based on whether an additional streaming session is to occur between the content device 212 and the wearable device 202, whether the wearable device 202 has been powered off, etc.

Figure 5B:
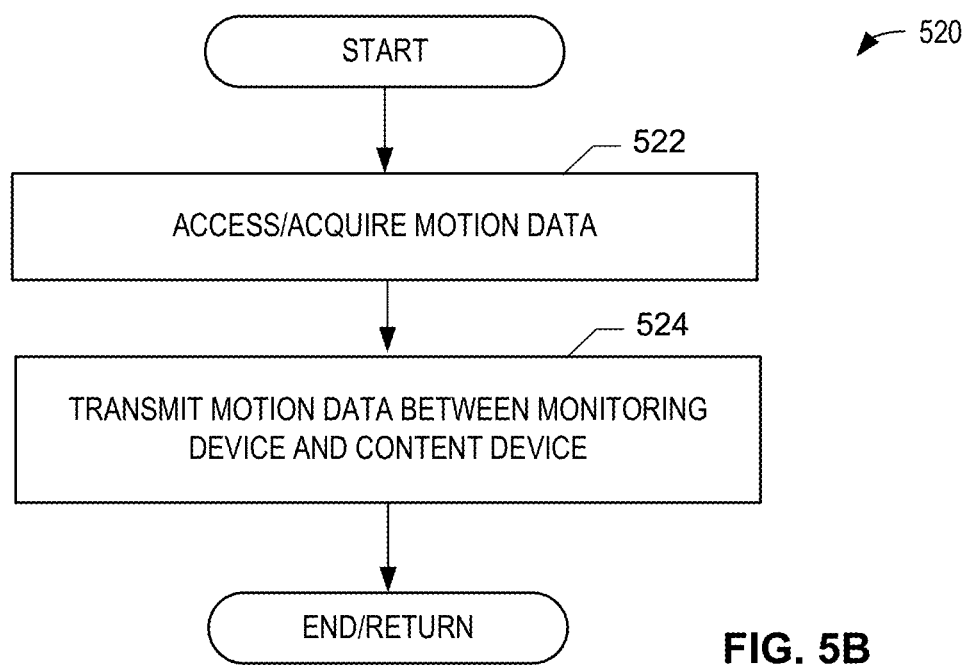
FIG. 5B is a flowchart representative of an example method that can be implemented in examples disclosed herein.

FIG. 5B is a flowchart representative of an example method 520 that can be implemented in examples disclosed herein. The example method 520 begins when the user is wearing the wearable device 202 to listen and/or view content presented by the content device 212.

At block 522, the sensor 206 accesses/acquires motion data (e.g., raw motion data, data indicating motion, data indicating exceeding a threshold degree of motion, etc.) of the user. In some examples, the motion data includes the orientation, acceleration, or rotational velocity detected by the sensor 206. In some examples, the sensor 206 acquires data pertaining to infrared light radiating from nearby objects to determine if the monitoring device and, therefore, the user is in motion during the exposure period. Additionally or alternatively, a threshold degree of motion of the user and/or the wearable device 202 causes the sensor 206 to provide the motion data.

At block 524, in the illustrated example, the transmitter 208 transmits the motion data acquired by the sensor 206 from the wearable device 202 to the content device 212 and the process ends. In some examples, the transmitter 208 is coupled to or includes low energy Bluetooth™ circuitry to wirelessly transmit the motion data acquired by the sensor 206 to the content device 212.

Figure 6:
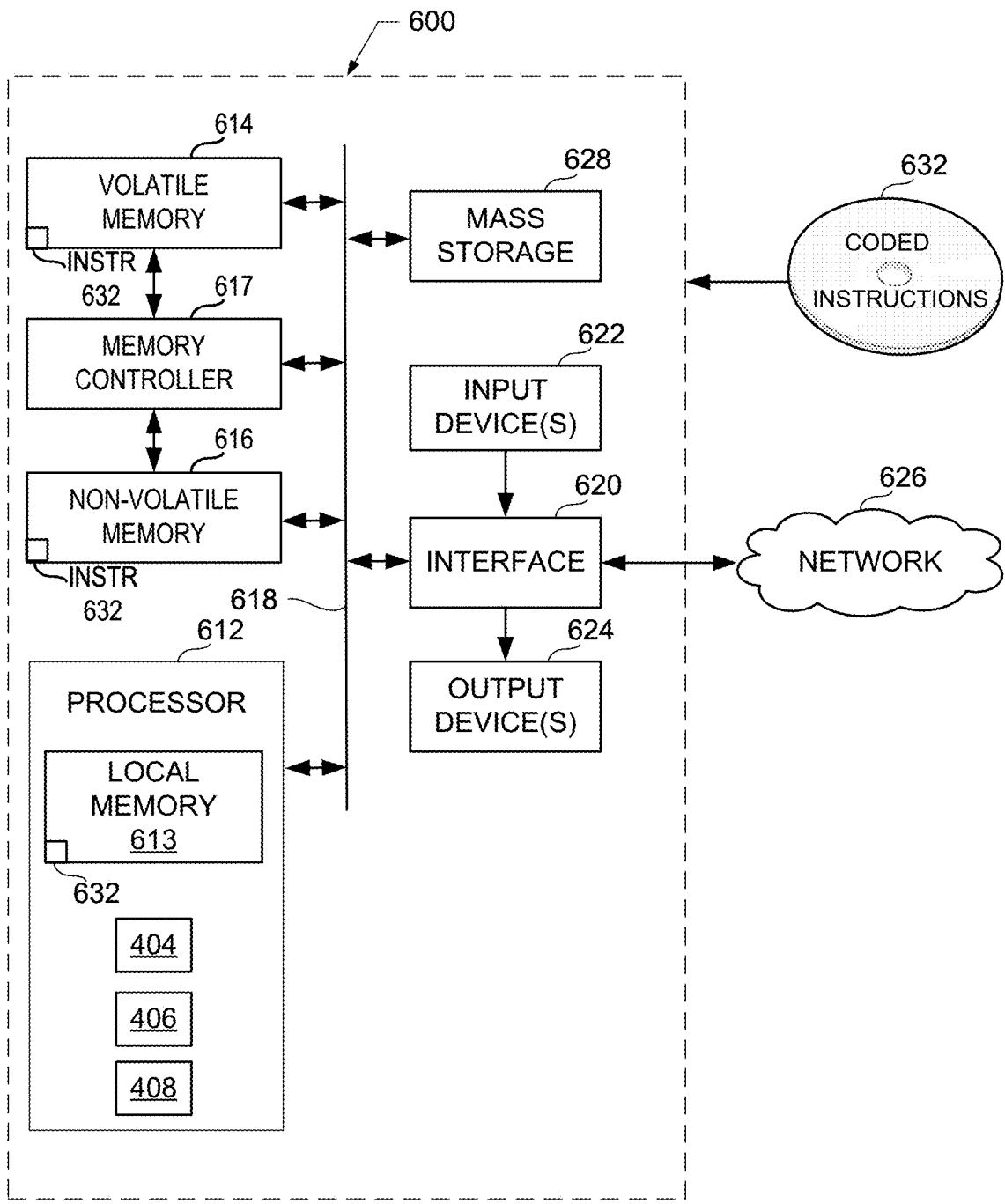
FIG. 6 is a block diagram of an example processing platform including processor circuitry to execute the example machine readable instructions of FIG. 5A to implement the example user monitoring system of FIG. 2 and/or the example active audience measurement system of FIG. 4.

FIG. 6 is a block diagram of an example processor platform 600 structured to execute and/or instantiate the machine readable instructions and/or operations of FIGS. 5A and 5B to implement the example audience analyzer system 400 of FIG. 4. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example movement analyzer circuitry 404, the example content identifier circuitry 406, and the example classifier circuitry 408.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 5A, may be stored in the mass storage device 628, in the volatile memory 614, in the non-volatile memory 616, and/or on a removable non-transitory computer readable storage medium such as a CD or DVD.

Figure 7:
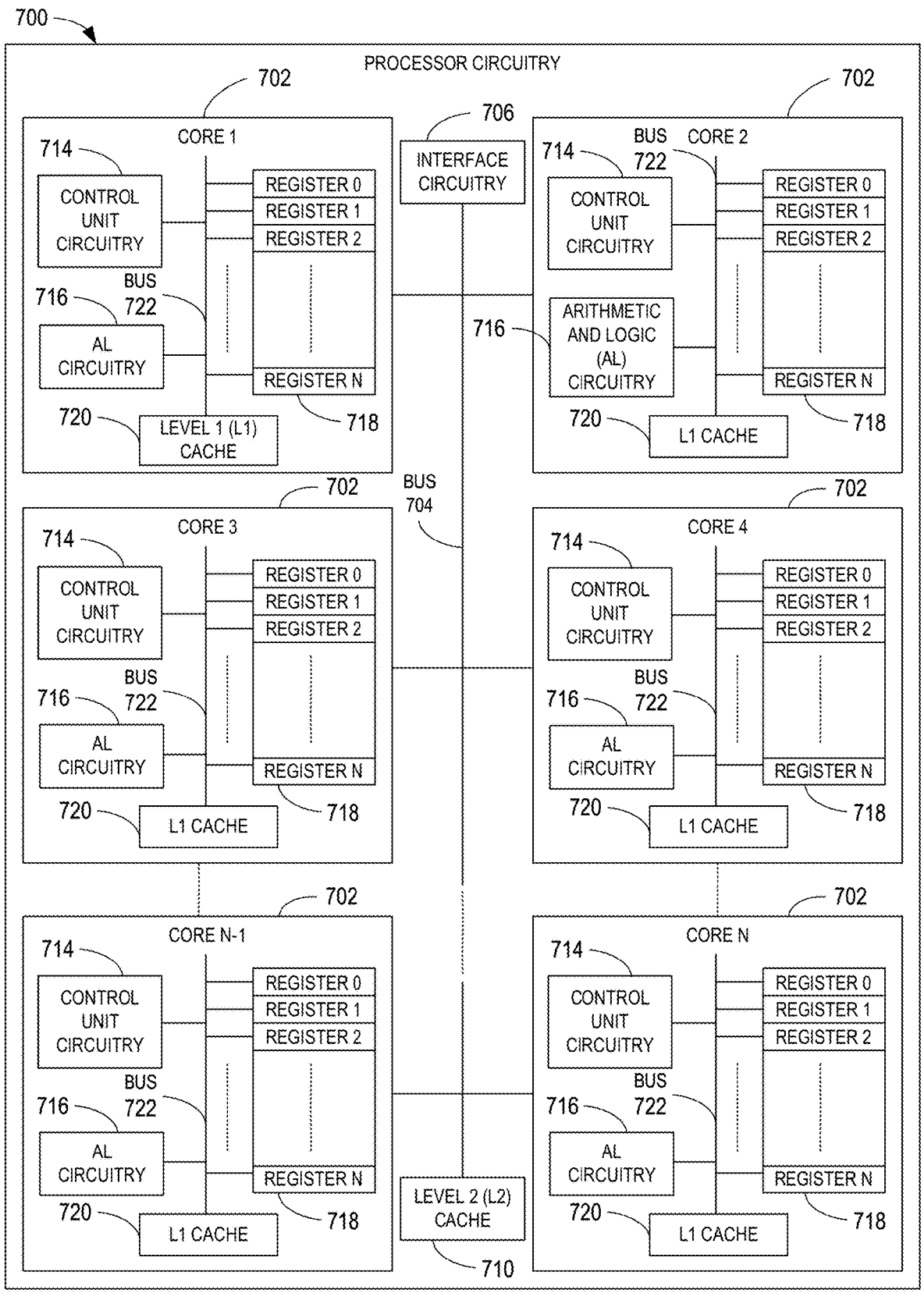
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5A.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_ cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 704 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
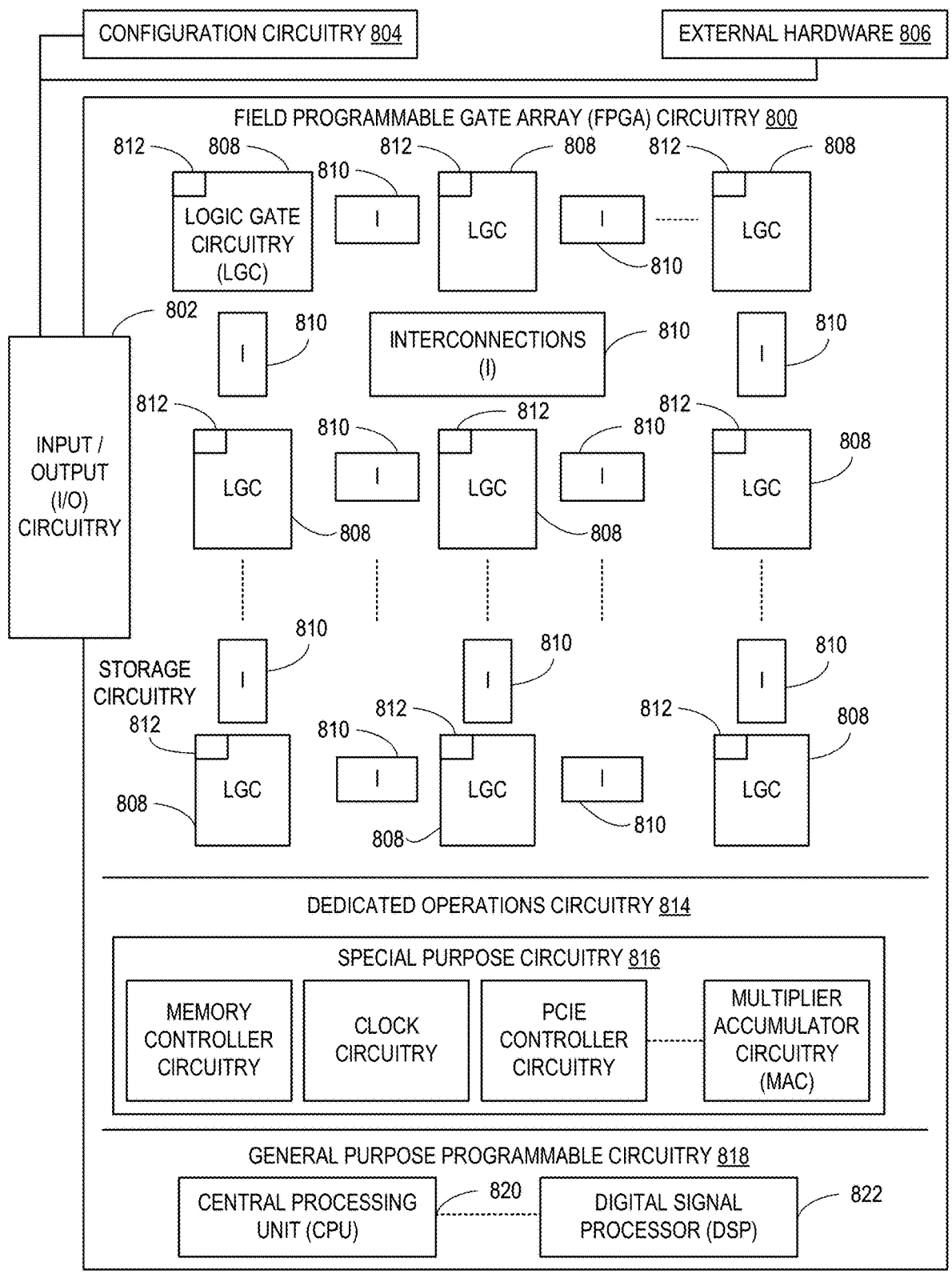
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5A but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 5A. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5A. As such, the FPGA circuitry 800 may be structured to effectively instantiate some or all of the machine readable instructions of the flowchart of FIG. 5A as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5A faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5A and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 5A may be executed by one or more of the cores 702 of FIG. 7 and a second portion of the machine readable instructions represented by the flowchart of FIG. 5A may be executed by the FPGA circuitry 800 of FIG. 8.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
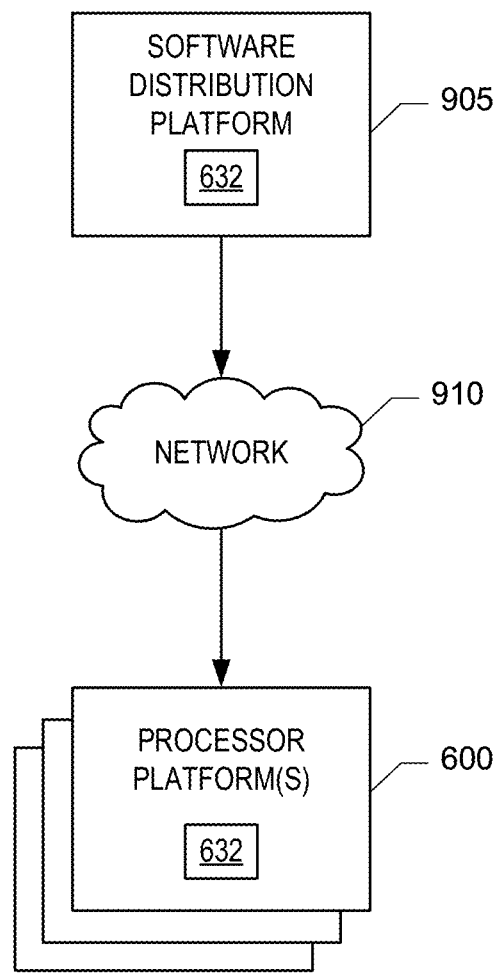
FIG. 9 is a block diagram of an example software distribution platform (e.g., one or more servers) to distribute software (e.g., software corresponding to the example machine readable instructions of FIG. 5A to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 500 of FIG. 5A, as described above. The one or more servers of the example software distribution platform 905 are in communication with a network 910, which may correspond to any one or more of the Internet and/or the example network 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 500 of FIG. 5A, may be downloaded to the example audience analyzer system 400, which is to execute the machine readable instructions 632 to implement the example user monitoring system 200. In some example, one or more servers of the software distribution platform 905 periodically offer, transmit, and/or force updates to the software (e.g., the example machine readable instructions 632 of FIG.

6) to ensure improvements, patches, updates, etc., are distributed and applied to the software at the end user devices.

Further examples and combinations thereof include the following:

Example 1 includes a monitoring device to determine a presence of a user in a metering environment, the monitoring device comprising a mount to couple the monitoring device to a wearable device to be worn by the user, the wearable device to receive content from a content device, a sensor to detect motion of the user, and a transmitter to transmit motion data pertaining to the detected motion of the user for the determination of the presence of the user.

Example 2 includes the monitoring device as defined in example 1, wherein the transmitter is to transmit the motion data to the content device.

Example 3 includes the monitoring device as defined in example 1, wherein the mount includes at least one of an adhesive, a suction cup, or a clasp.

Example 4 includes the monitoring device as defined in example 1, wherein the monitoring device is integral with circuitry of the wearable device.

Example 5 includes the monitoring device as defined in example 1, wherein the sensor is to detect a change in at least one of an acceleration, an orientation, or a rotational velocity of the user of the wearable device.

Example 6 includes the monitoring device as defined in example 1, wherein the content device includes at least one of a computer, a television, a set top box, or a gaming console.

Example 7 includes the monitoring device as defined in example 1, further including a solar panel to power the sensor and the transmitter.

Example 8 includes the monitoring device as defined in example 1, wherein the transmitter includes low energy Bluetooth™ circuitry to wirelessly transmit the motion data.

Example 9 includes a method for determining a presence of a user wearing a wearable device, the method comprising detecting, with a sensor of a monitoring device coupled to the wearable device, a motion of the user, transmitting, with a transmitter of the monitoring device, motion data from the sensor to a content device, the motion data extracted from sensor output of the sensor, the motion data pertaining to the detected motion of the user, the content device providing content to the wearable device, and determining, by executing instructions with at least one processor, the presence of the user based on the motion data.

Example 10 includes the method as defined in example 9, further including associating the determined presence with metering data corresponding to the user and the content.

Example 11 includes the method as defined in example 9, wherein the detecting of the motion of the user includes detecting a change in at least one of an orientation or an acceleration of the wearable device.

Example 12 includes the method as defined in example 9, further including causing the wearable device to enter a low-power mode in response to determining that a degree of the motion data is below a threshold value.

Example 13 includes the method as defined in example 9, wherein the determining of the presence of the user includes determining that a degree of the detected motion has exceeded a threshold value.

Example 14 includes the method of example 9, further including, in response to determining the presence of the user, associating the content with the user.

Example 15 includes a non-transitory computer readable medium comprising instructions which, when executed, cause at least one processor to compare motion data to a threshold value, the motion data extracted from signals outputted by a sensor of a monitoring device coupled to a wearable device, the wearable device communicatively coupled to a content device to receive content therefrom, the motion data transmitted from the monitoring device to the content device, and determine a presence of a user wearing the wearable device based on the comparison.

Example 16 includes the non-transitory computer readable medium as defined in example 15, wherein the instructions cause the at least one processor to associate the determined presence with metering data corresponding to the user and the content.

Example 17 includes the non-transitory computer readable medium as defined in example 15, wherein the motion data includes a change in at least one of an acceleration, an orientation, or a rotational velocity of the user of the wearable device.

Example 18 includes the non-transitory computer readable medium as defined in example 15, wherein the determining of the user presence includes determining that a degree of a motion corresponding to the motion data has exceeded the threshold value.

Example 19 includes the non-transitory computer readable medium as defined in example 15, wherein the instructions further cause the at least one processor to classify an exposure period as active when motion of the motion data exceeds the threshold value, and associate the content with a user in response to the exposure period being classified as active.

Example 20 includes the non-transitory computer readable medium as defined in example 15, wherein the instructions further cause the at least one processor to store an identifier of the content during an active exposure period in a database in response to the determination of the presence of the user.

Example 21 includes the non-transitory computer readable medium as defined in example 15, wherein the instructions further cause the at least one processor to cause the content device to transmit a signal to place the wearable device into a low-power mode based on the motion data indicating that the motion of the user is below the threshold value.

Example 22 includes an apparatus comprising at least one memory, instructions in the apparatus, processor circuitry to execute the instructions to compare motion data to a threshold value, the motion data extracted from signals outputted by a sensor of a monitoring device coupled to a wearable device, the wearable device communicatively coupled to a content device to receive content therefrom, the motion data transmitted from the monitoring device to the content device, and determine a presence of a user wearing the wearable device based on the comparison.

Example 23 includes the apparatus as defined in example 22, wherein the processor is to execute instructions to associate the determined presence with metering data corresponding to the user and the content.

Example 24 includes the apparatus as defined in example 22, wherein the motion data includes a change in at least one of an acceleration, an orientation, or a rotational velocity of the user of the wearable device.

Example 25 includes the apparatus as defined in example 22, wherein the determination of the presence of the user includes determining that a degree of a motion corresponding to the motion data has exceeded the threshold value.

Example 26 includes the apparatus as defined in example 22, wherein the processor is to execute instructions to classify an exposure period as active when motion of the motion data exceeds the threshold value, and associate the content with a user in response to the exposure period being classified as active.

Example 27 includes the apparatus as defined in example 22, wherein the processor is to execute instructions to store an identifier of the content during an active exposure period in a database in response to the determination of the presence of the user.

Example 28 includes the apparatus as defined in example 22, wherein the processor is to execute instructions to cause the content device to transmit a signal to place the wearable device into a low-power mode based on the motion data indicating that the motion of the user is below the threshold value.

From the foregoing, it will be appreciated that example methods, apparatus and articles of manufacture have been disclosed that enable accurate determination of audience exposure. Examples disclosed herein also enable the transmission of content data from a content device to a wearable device having a monitoring device coupled thereto. Examples disclosed herein can be cost-effective and easy to implement, thereby increasing utilization thereof. Examples disclosed herein enable precise exposure direction. Examples disclosed herein can also control a wearable device based on motion sensing (e.g., the wearable device is entered into a low power mode based on not detecting a threshold degree of movement from the monitoring device).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system to determine a presence of a user in a metering environment, the system comprising:
   a mount to couple a monitoring device to a wearable device to be worn by the user, the wearable device to receive content from a content device;
   a sensor to detect motion of the user;
   a transmitter to transmit motion data pertaining to the detected motion of the user;
   machine readable instructions; and
   programmable circuitry to execute the instructions to:
      determine the presence of the user based on the motion data,
      identify the content received at the wearable device from the content device, and
      associate the user to the identified content based on the determined presence to generate metering data.

2. The system as defined in claim 1, wherein the transmitter is to transmit the motion data to the content device.

3. The system as defined in claim 1, wherein the mount includes at least one of an adhesive, a suction cup, or a clasp.

4. The system as defined in claim 1, wherein the monitoring device is integral with circuitry of the wearable device.

5. The system as defined in claim 1, wherein the sensor is to detect a change in at least one of an acceleration, an orientation, or a rotational velocity of the user of the wearable device.

6. The system as defined in claim 1, wherein the content device includes at least one of a computer, a television, a set top box, or a gaming console.

7. The system as defined in claim 1, further including a solar panel to power the sensor and the transmitter.

8. The system as defined in claim 1, wherein the transmitter includes low energy Bluetooth™ circuitry to wirelessly transmit the motion data.

9. A method for determining a presence of a user wearing a wearable device, the method comprising:
   detecting, with a sensor of a monitoring device coupled to the wearable device, a motion of the user;
   transmitting, with a transmitter of the monitoring device, motion data from the sensor to a content device, the motion data extracted from sensor output of the sensor, the motion data pertaining to the detected motion of the user;
   determining, by executing instructions with at least one processor, the presence of the user based on the motion data;
   identifying, by executing instructions with the at least one processor, content provided to the wearable device from the content device; and
   associating, by executing instructions with the at least one processor, the determined presence with metering data that assigns the user to the identified content provided to the wearable device.

10. The method as defined in claim 9, wherein the detecting of the motion of the user includes detecting a change in at least one of an orientation or an acceleration of the wearable device.

11. The method as defined in claim 9, further including causing the wearable device to enter a low-power mode in response to determining that a degree of the motion data is below a threshold value.

12. The method as defined in claim 9, wherein the determining of the presence of the user includes determining that a degree of the detected motion has exceeded a threshold value.

13. A non-transitory computer readable medium comprising instructions which, when executed, cause at least one processor to:
   identify content received by a wearable device from a content device,
   compare motion data to a threshold value, the motion data extracted from signals outputted by a sensor of a monitoring device coupled to the wearable device, the motion data transmitted from the monitoring device to the content device;
   determine a presence of a user wearing the wearable device based on the comparison; and
   associate the determined presence with metering data that assigns the user to the identified content received by the wearable device.

14. The non-transitory computer readable medium as defined in claim 13, wherein the motion data includes a change in at least one of an acceleration, an orientation, or a rotational velocity of the user of the wearable device.

15. The non-transitory computer readable medium as defined in claim 13, wherein the determining of the user presence includes determining that a degree of a motion corresponding to the motion data has exceeded the threshold value.

16. The non-transitory computer readable medium as defined in claim 13, wherein the instructions further cause the at least one processor to:
   classify an exposure period as active when motion of the motion data exceeds the threshold value, and
   associate the content with the user in response to the exposure period being classified as active.

17. The non-transitory computer readable medium as defined in claim 13, wherein the instructions further cause the at least one processor to store an identifier of the content during an active exposure period in a database in response to the determination of the presence of the user.

18. The non-transitory computer readable medium as defined in claim 13, wherein the instructions further cause the at least one processor to cause the content device to transmit a signal to place the wearable device into a low-power mode based on the motion data indicating that the motion of the user is below the threshold value.

19. An apparatus comprising:
   at least one memory;
   instructions;
   programmable circuitry to execute the instructions to:
      identify content received by a wearable device from a content device,
      compare motion data to a threshold value, the motion data extracted from signals outputted by a sensor of a monitoring device coupled to the wearable device, the motion data transmitted from the monitoring device to the content device,
      determine a presence of a user wearing the wearable device based on the comparison, and
      associate the determined presence with metering data corresponding to the user and the identified content.

20. The apparatus as defined in claim 19, wherein the motion data includes a change in at least one of an acceleration, an orientation, or a rotational velocity of the user of the wearable device.

21. The apparatus as defined in claim 19, wherein the determination of the presence of the user includes determining that a degree of a motion corresponding to the motion data has exceeded the threshold value.

22. The apparatus as defined in claim 19, wherein the programmable circuitry is to execute instructions to:
   classify an exposure period as active when motion of the motion data exceeds the threshold value, and
   associate the content with the user in response to the exposure period being classified as active.

23. The apparatus as defined in claim 19, wherein the programmable circuitry is to execute instructions to store an identifier of the content during an active exposure period in a database in response to the determination of the presence of the user.

24. The apparatus as defined in claim 19, wherein the programmable circuitry is to execute instructions to cause the content device to transmit a signal to place the wearable device into a low-power mode based on the motion data indicating that the motion of the user is below the threshold value.

25. The system as defined in claim 1, wherein the metering data corresponds to exposure data of content with respect to a population.

26. The system as defined in claim 1, further including a metering collector to collect the metering data and provide the metering data to a processing facility.

27. The system as defined in claim 1, wherein the programmable circuitry is to execute the instructions to augment the metering data with information corresponding to the presence.

* * * * *